(12) United States Patent
Nibecker

(10) Patent No.: US 11,959,529 B1
(45) Date of Patent: Apr. 16, 2024

(54) ALLOW AIR SPRINGS TO BE SELF-CHARGING

(71) Applicant: Alfred Franklin Nibecker, Honokaa, HI (US)

(72) Inventor: Alfred Franklin Nibecker, Honokaa, HI (US)

( * ) Notice: Subject to any disclaimer, the term of this patent is extended or adjusted under 35 U.S.C. 154(b) by 0 days.

(21) Appl. No.: 18/449,438

(22) Filed: Aug. 14, 2023

(51) Int. Cl.
*F16F 9/34* (2006.01)
*B25C 1/04* (2006.01)
*F16F 9/44* (2006.01)

(52) U.S. Cl.
CPC .............. *F16F 9/3405* (2013.01); *F16F 9/44* (2013.01); *B25C 1/042* (2013.01); *F16F 2230/183* (2013.01)

(58) Field of Classification Search
CPC ...... F16F 9/3405; F16F 9/44; F16F 2230/183; F16F 9/34; F16F 9/5126; B25B 1/042; B60G 17/044
USPC ......................................................... 267/113
See application file for complete search history.

(56) References Cited

U.S. PATENT DOCUMENTS

| | | | | | |
|---|---|---|---|---|---|
| 1,205,433 | A | * | 11/1916 | Name not available | F16F 9/44 188/283 |
| 2,944,639 | A | * | 7/1960 | Blake | F16F 9/18 188/269 |
| 3,362,508 | A | * | 1/1968 | Mayer | F16F 9/344 188/320 |
| 3,672,474 | A | * | 6/1972 | Mayer | F16F 9/344 188/320 |
| 3,896,908 | A | * | 7/1975 | Petrak | F16F 9/5126 188/322.22 |
| 4,535,876 | A | * | 8/1985 | Taylor | F16F 9/34 137/269.5 |
| 4,577,840 | A | * | 3/1986 | Meller | B60G 17/044 137/859 |
| 5,058,868 | A | * | 10/1991 | Sirven | F16F 9/06 267/152 |
| 5,207,300 | A | * | 5/1993 | Engel | B60G 17/08 188/266.2 |
| 5,293,968 | A | * | 3/1994 | Schuelke | F16F 9/185 188/282.3 |
| 5,390,703 | A | * | 2/1995 | Tengesdal | F16K 1/54 137/629 |

(Continued)

*Primary Examiner* — Robert A. Siconolfi
*Assistant Examiner* — James K Hsiao
(74) *Attorney, Agent, or Firm* — Lewis Roca Rothgerber CHRISTIE LLP; Dustin R. Szakalski; David Plumley

(57) ABSTRACT

The present embodiment generally relates to a mechanical assembly which modifies and enhances the performance of a critical portion of the parts which comprise an air spring assembly. A key element common with an air spring assembly is the precharge chamber. This chamber is filled at the factory with compressed gas and along with a floating piston and a piston rod, creates the basic air spring assembly. Although this is a sealed chamber, the potential for air leakage is well documented. The inability to maintain the design gas pressure in the precharge chamber requires the chamber to initially be overcharged to remain functional even with the slow loss of air charge. The present invention demonstrates how the precharge assembly found in all such air springs can be modified and, with the addition of a few parts, be capable of maintaining the precharge pressure at an optimum level.

3 Claims, 6 Drawing Sheets

FLOATING PISTON ASSEMBLY
(PISTON WITH ENCLOSED AIR CHARGE OPEN)

(56) References Cited

U.S. PATENT DOCUMENTS

| | | | | |
|---|---|---|---|---|
| 5,623,861 A * | 4/1997 | Ward | ............... | F15B 15/225 |
| | | | | 251/117 |
| 5,775,677 A * | 7/1998 | Englund | ............ | B62K 25/04 |
| | | | | 188/322.19 |
| 6,360,857 B1 * | 3/2002 | Fox | .................. | F16F 9/3485 |
| | | | | 188/319.1 |
| 6,612,410 B1 * | 9/2003 | Antonovsky | ............ | F16F 9/49 |
| | | | | 267/64.11 |
| 6,824,146 B2 * | 11/2004 | Kang | ............... | F16F 9/0481 |
| | | | | 280/124.16 |
| 6,938,704 B2 * | 9/2005 | Berger | ............. | B25D 11/005 |
| | | | | 173/202 |
| 6,938,887 B2 * | 9/2005 | Achenbach | ........... | F16F 9/084 |
| | | | | 267/64.18 |
| 8,869,959 B2 * | 10/2014 | Yablon | ............... | F16F 9/466 |
| | | | | 188/319.1 |
| 9,079,469 B2 * | 7/2015 | Dehmel | ............ | B60G 15/10 |
| 9,127,493 B2 * | 9/2015 | Zimmer | ............. | F16F 9/368 |
| 9,151,354 B2 * | 10/2015 | Ewers | .............. | F16F 9/464 |
| 9,605,726 B2 * | 3/2017 | Baldoni | .............. | F16F 9/49 |
| 9,797,467 B2 * | 10/2017 | Wootten | .......... | B60G 17/0416 |
| 10,557,674 B1 * | 2/2020 | Mantas | ............... | F41A 3/84 |
| 11,173,982 B2 * | 11/2021 | Angell | .............. | F16F 9/0472 |
| 2002/0108826 A1 * | 8/2002 | Miller | .............. | F16F 9/466 |
| | | | | 188/280 |
| 2005/0139440 A1 * | 6/2005 | Tomiji | ............ | F16F 9/5126 |
| | | | | 188/280 |
| 2005/0269176 A1 * | 12/2005 | Tomiji | ................ | E05F 5/10 |
| | | | | 188/284 |
| 2006/0225978 A1 * | 10/2006 | Yun | ..................... | F16F 9/44 |
| | | | | 188/299.1 |
| 2009/0146351 A1 * | 6/2009 | Boerschig | ........... | F16F 9/3405 |
| | | | | 137/829 |
| 2009/0148289 A1 * | 6/2009 | Edenfeld | ............. | F03D 80/00 |
| | | | | 416/145 |
| 2010/0244340 A1 * | 9/2010 | Wootten | ............. | B60G 15/12 |
| | | | | 188/313 |
| 2011/0101579 A1 * | 5/2011 | Polakowski | ......... | F16F 9/3235 |
| | | | | 188/313 |
| 2011/0198787 A1 * | 8/2011 | Hamberg | ............ | F16F 9/58 |
| | | | | 267/113 |
| 2012/0305350 A1 * | 12/2012 | Ericksen | ............ | B62K 25/06 |
| | | | | 188/269 |
| 2012/0312005 A1 * | 12/2012 | Ackermann | ........... | F16F 9/06 |
| | | | | 60/413 |
| 2015/0362040 A1 * | 12/2015 | Fujihara | ............ | F16F 9/003 |
| | | | | 267/140.11 |
| 2017/0240242 A1 * | 8/2017 | Kurita | .................. | F16F 9/28 |
| 2018/0135718 A1 * | 5/2018 | Kobayashi | .......... | F16F 9/516 |
| 2018/0135720 A1 * | 5/2018 | De Kock | ............... | F16F 9/34 |
| 2018/0172106 A1 * | 6/2018 | Patzenhauer | ......... | F16F 9/3485 |
| 2020/0347906 A1 * | 11/2020 | Cheng | ................ | F16F 9/0218 |

* cited by examiner

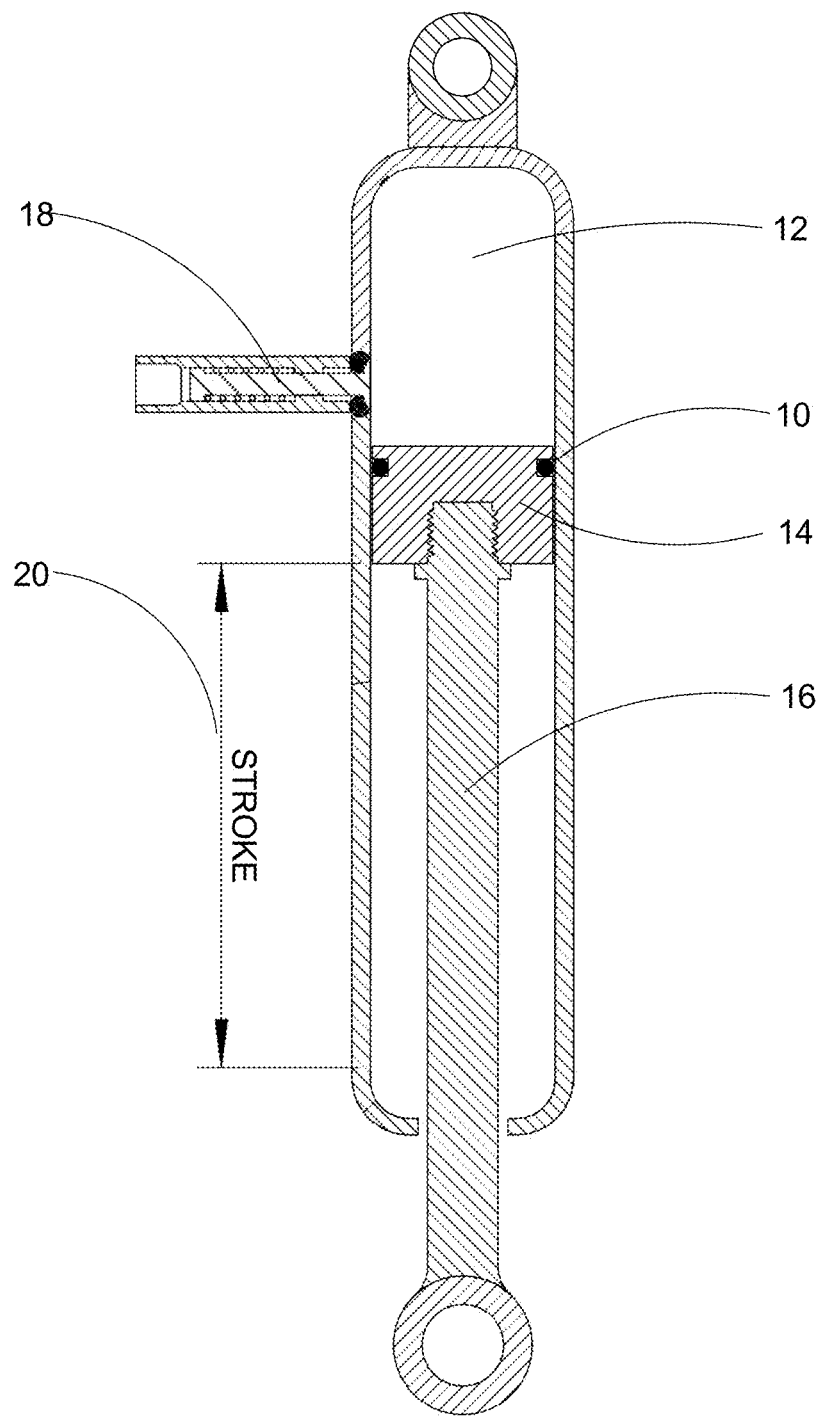
FIG. 1 - PRESENT ART: BASIC AIR SHOCK
(WITH PISTON FULLY COMPRESSED)

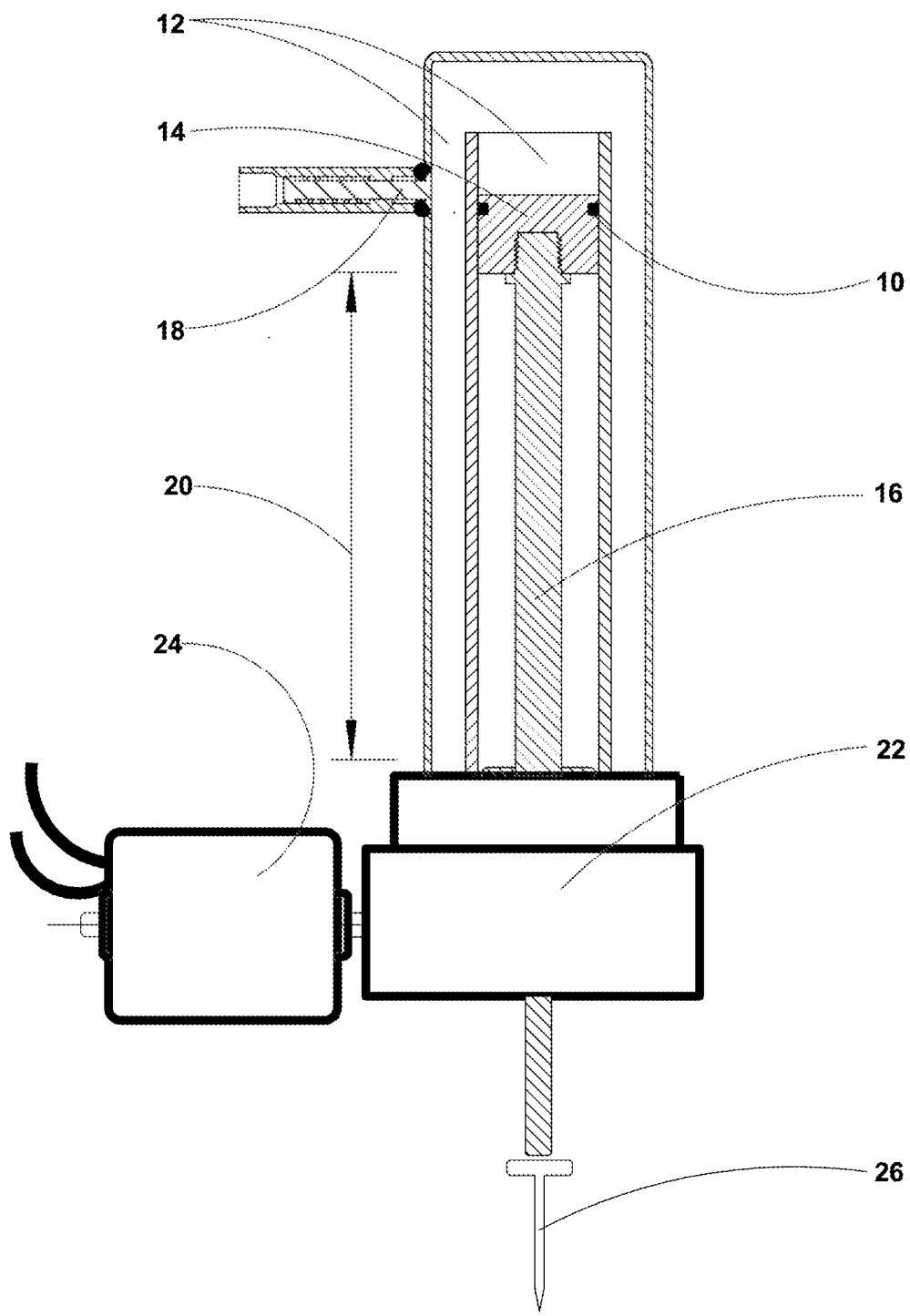
FIG. 2 - PRESENT ART: BASIC FASTENER DRIVER
(PISTON IN POSITION TO DRIVE NAIL)

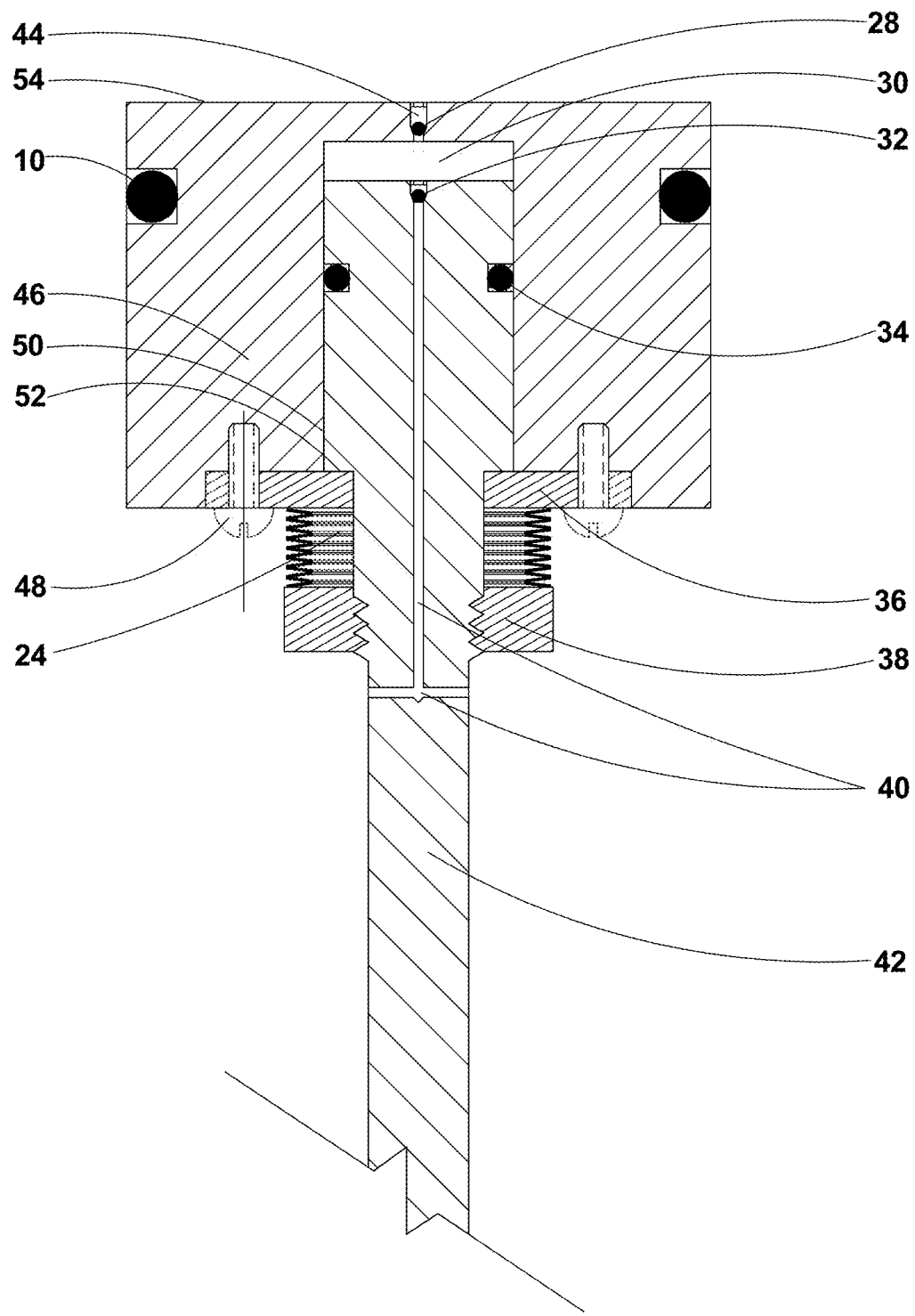
FIG. 3 - FLOATING PISTON ASSEMBLY
(PISTON WITH ENCLOSED AIR CHARGE OPEN)

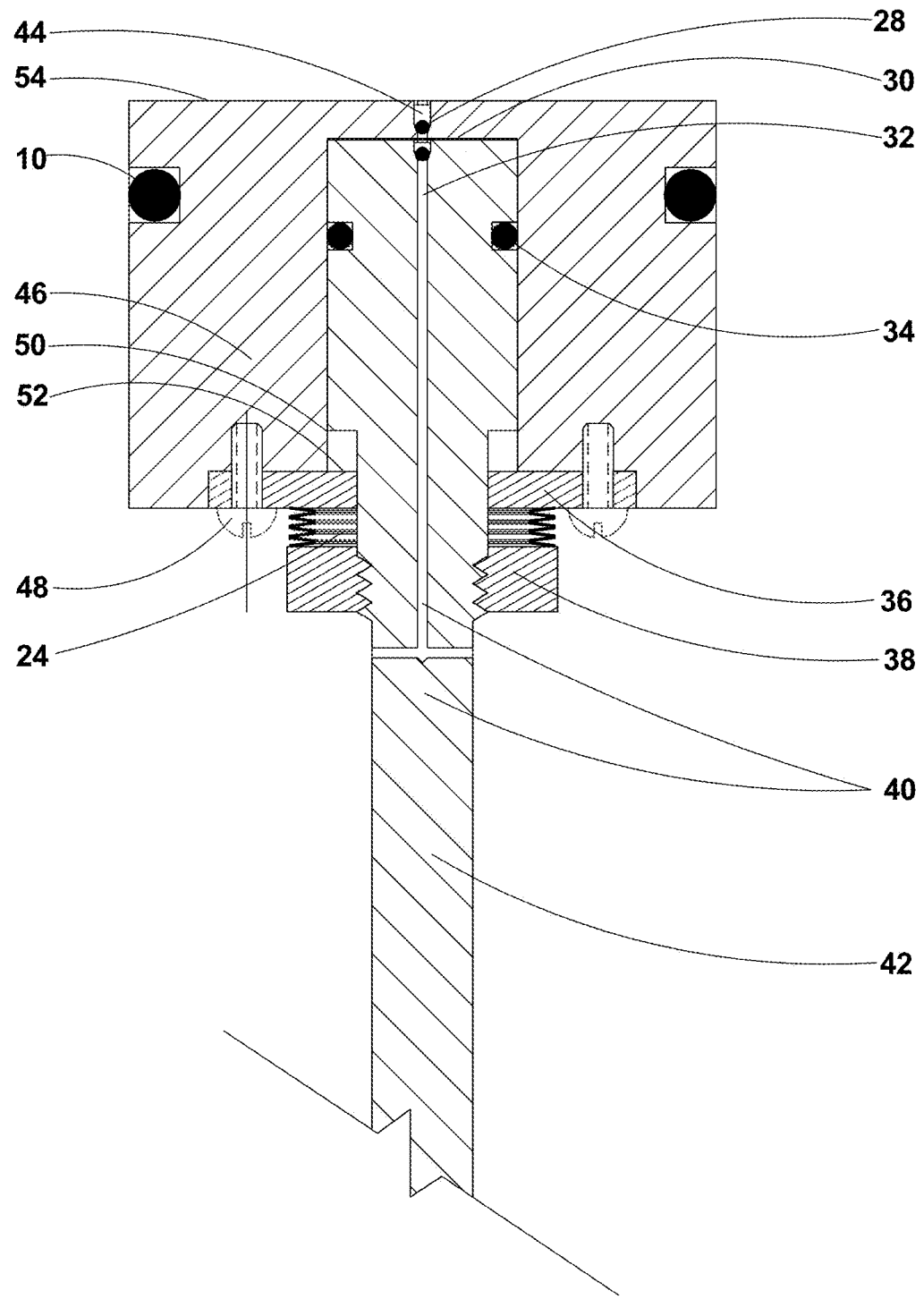
**FIG. 4 - FLOATING PISTON ASSEMBLY
(PISTON WITH ENCLOSED AIR CHARGE CLOSED)**

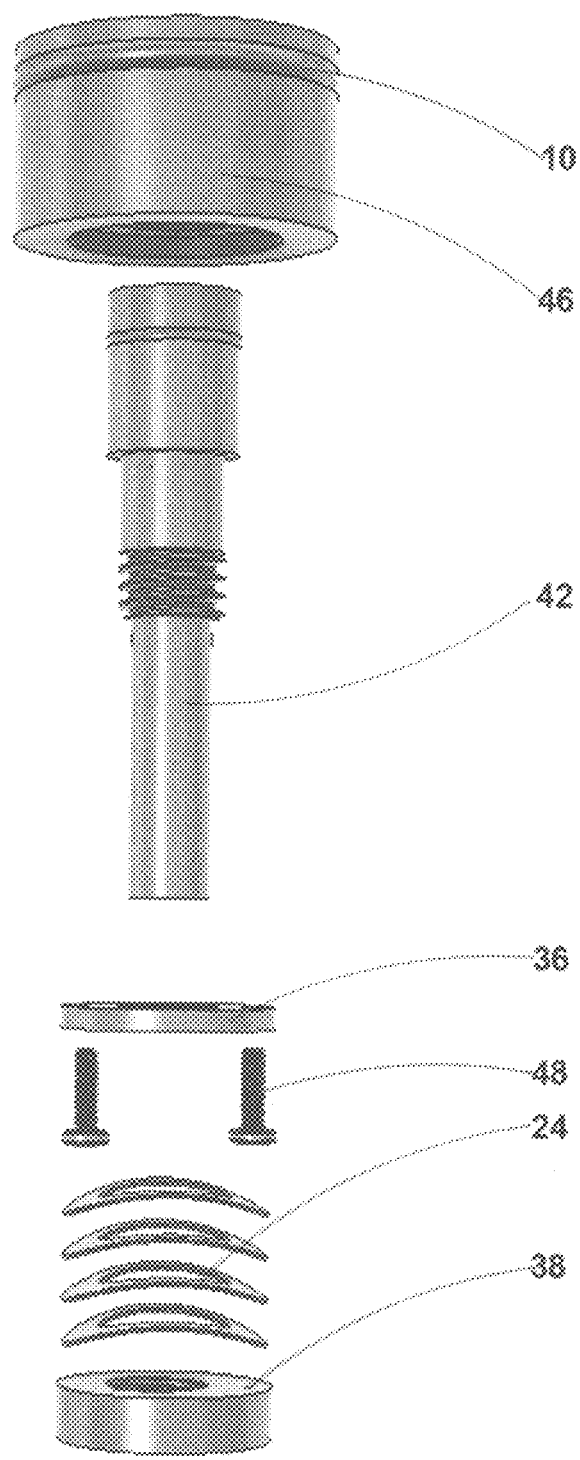
FIG. 5 - PRIMARY PARTS:
FLOATING PISTON ASSEMBLY

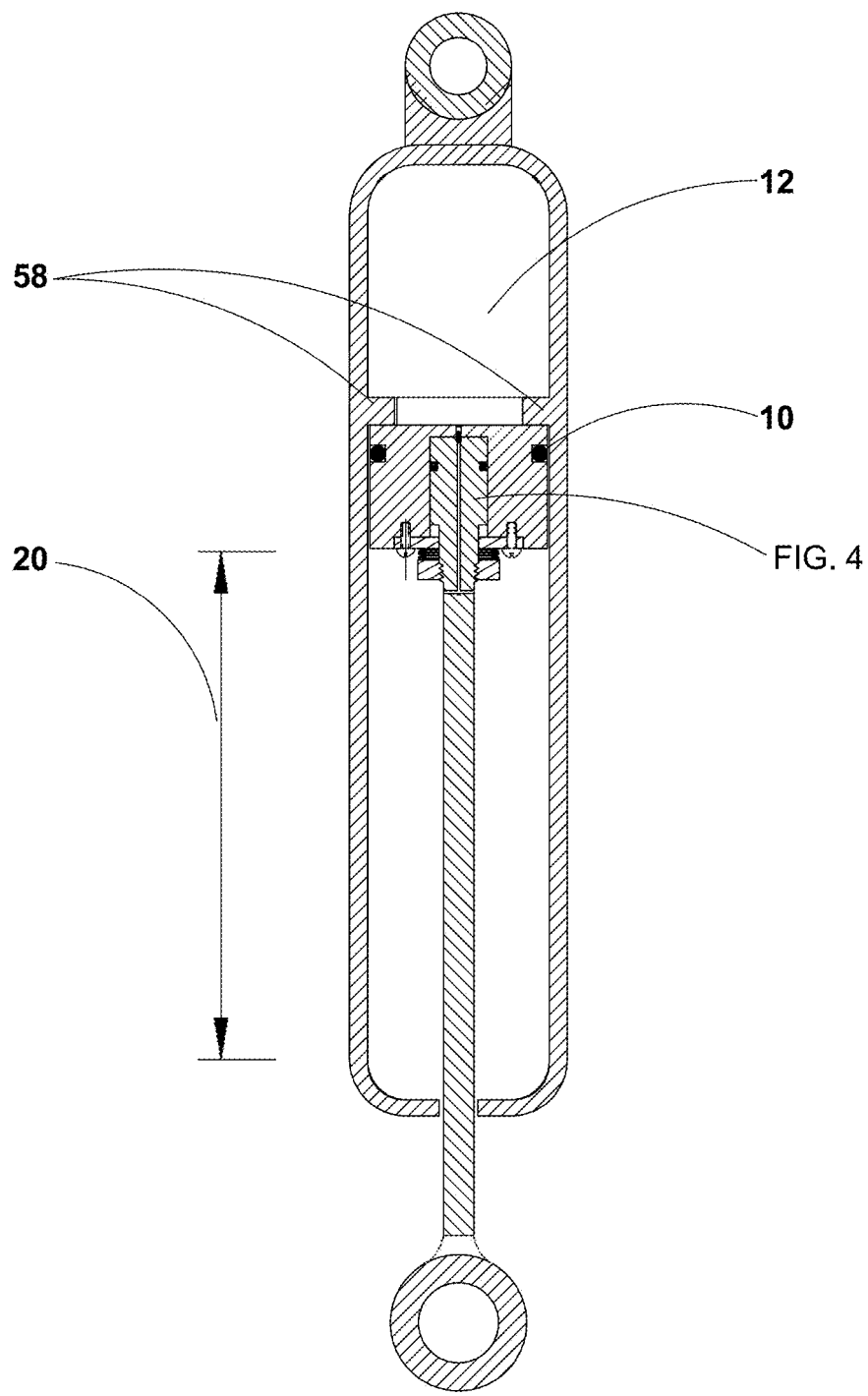
FIG. 6 - PRECHARGE CHAMBER W/ INTERNAL SLEEVE
(WITH PISTON FULLY COMPRESSED)

ALLOW AIR SPRINGS TO BE SELF-CHARGING

CROSS REFERENCE TO RELATED APPLICATIONS

This application claims the benefit of provisional application No. 63/466,903, filed 2023 May 16 by the present inventor.

BACKGROUND—PRIOR ART

The following is a tabulation of some prior art that presently appears relevant:

U.S. Patents

| Pat. No. | Kind Code | Issue Date | Patentee |
| --- | --- | --- | --- |
| U.S. Pat. No. 1,062,758 | A | 1913 May 27 | Bayley; Guv L. |
| U.S. Pat. No. 4,759,260 | A | 1988 Jul. 26 | Lew; Yon S |
| U.S. Pat. No. 3,512,243 | A | 1970 May 19 | Kensei; Suzuki |
| U.S. Pat. No. 4,044,866 | A | 1977 Aug. 30 | Shida; Kunio |
| U.S. Pat. No. 5,409,248 | A | 1995 Apr. 25 | Williams; Richard L. |
| U.S. Pat. No. 5,669,597 | A | 1997 Sep. 23 | Rittstieg; Henning |
| U.S. Pat. No. 5,720,423 | B2 | 1998 Feb. 24 | Kondo; Masayoshi et al. |
| US 20190039680 | A1 | 2019 Feb. 07 | Angell; Joshua J. |
| U.S. Pat. No. 11,383,366 | B2 | 2022 Jul. 12 | Pedicini; Christopher et al |
| US 20230080108 | A1 | 2023 Mar. 16 | Timoney; Eanna Pronsias |
| U.S. Pat. No. 11,618,145 | B2 | 2023 Apr. 04 | Bierdeman; David A. et al |

The present disclosure relates to a floating piston which reciprocates within a cylinder. The end of the cylinder opposite the piston is sealed, creating a chamber. A one-way valve is provided which allows compressed air to be inserted into this chamber. Once so charged, the portion of the cylinder encompassing the volume created between the floating piston and the opposite sealed end of the cylinder may be termed the 'precharge chamber'. The precharge chamber may be formed from a single precharge chamber cylinder or include an outer cylinder with the intent of increasing the air volume contained in the precharge chamber. A piston rod is attached to the floating piston and anchored whereby the travel of the floating piston away from the sealed end of the chamber is restrained. Lastly, the chamber itself is restrained such that it resists the force generated by the piston rod when the piston rod urges the floating piston against the compressed air charge in the precharge chamber. This assembly, comprising a circular cylindrical tube sealed at one end, having a floating piston inserted into the opposite end, and with the created enclosed volume charged with compressed air describes the basis by which an 'air spring' is created.

Air springs have distinct advantages over common mechanical compression springs. The foremost of these advantages is probably the ability to vary the force generated by the air spring as well as the energy stored and released simply by varying the pressure in the precharge chamber.

A force exerted on the piston rod toward the floating piston and the subsequent travel of the floating piston against the compressed air charge in the precharge chamber require the input of energy. Properly designed, the great majority of this energy input is retained as 'spring energy' in the further compression of the air charge in the precharge chamber. Allowing the floating piston to reverse direction and translate away from the sealed end of the precharge chamber will begin the release of this stored energy through the piston rod to do useful work.

The air spring's ability to store and release energy efficiently and in a controlled manner finds applications in numerous mechanical devices. A common usage is the air spring's advantage when employed as pneumatic shock absorbers for vehicles. Rather than suffering a potentially damaging shock load resulting from a vehicle's tire(s) encountering an obstruction, the resulting quickly applied load is absorbed as energy into the air spring of the shock absorber. The resulting stored energy is then used to restore the vehicle to its desired elevation in respect to the roadway.

For an example of an air spring's employment in manufacturing, consider the modern self-contained fastener driver also often termed a 'nail gun'. One of the most modern and popular nail guns employs an air spring to quickly store energy in a precharge chamber. Controlled through a trigger mechanism, this energy is then released to efficiently force the piston rod against a fastener, driving the fastener into wood or other medium.

An essential requirement toward creating an efficient air spring is the retention of the compressed gas charge in the precharge chamber. A decrease in gas pressure in the precharge chamber due to leakage will quickly render the air spring inoperable. An early air spring fastener driving tool disclosed to U.S. Pat. No. 5,720,423 to Kondo used a separate air replenishing supply tank to bolster the pressure of the air in the precharge chamber. Pneumatic shock absorbers commonly use a separate air compressor to maintain or control the air pressure in the shock absorber's air spring. Where stationary seals are employed between joints in the equipment's assembly, a sliding seal must be used between the floating piston and the cylinder wall. To minimize gas leakage at this point, normally two or more seals are fitted on the floating piston. While most such air springs are charged with compressed air, a few utilize compressed nitrogen gas to help minimize the potential for leakage past the seals. Still, there has never been a sliding seal used to retain compressed gas which didn't exhibit some loss of pressure over time. Using the self-contained (battery-powered) precharged pneumatic nail gun as an example, a typical precharged nail gun is designed to cycle rapidly, driving nails up to three times per second. At the job site, such a gun may cycle many hundreds of times during the working day. Such use causes wear on the floating piston seals and gas leakage, while minimal at first, will increase with use. The precharge chamber initial pressure may be set at the factory well above the gas pressure requirement to fully drive fasteners. This will allow the gun to remain fully operable for a substantial time even with some leakage. However, the extra energy required to overcome the initially excessive pressure in the precharge chamber when compressing the gas spring wastes battery power. Some manufacturers require the nail gun to be returned to a service center when the precharge chamber's gas pressure drops below the operating point. This is especially true for nail guns which are charged with nitrogen gas. With other nail guns, a readily accessible charging port, similar to a common Schrader valve is often provided. This requires the operator to provide a means of charging the precharge chamber from a remote air compressor. Such a kit normally includes tubing to connect the precharge chamber valve to the air compressor and a pressure regulator to prohibit the chamber from being greatly overcharged. Should the chamber be charged with a pressure exceeding the manufacturer's design limit, the firing mechanism will be unable to overcome the resulting force required to fully compress the air spring and the gun will be inoperable. Even with the nail gun having an accessible charging port, an operator may have no way of knowing when the pressure in the precharge chamber is about to fall below the minimum for efficient operation. Typically, while the advantages to employing an air spring assembly are substantial over a standard coil spring in an application as described above, the disadvantage associated with loss of performance due to gas leakage is a major problem.

SUMMARY OF THE INVENTION

The objective of this discussion is to demonstrate that, with fairly simple modifications, the floating piston and piston rod assembly utilized in a typical air spring assembly may perform a secondary function of automatically maintaining the optimum air pressure in the precharge chamber. The piston rod will no longer be stationary in regard to the attached floating piston. A sleeve shall be provided within the floating piston which extends from the lower face of the piston and terminates near the piston's upper face. The upper end of the piston rod shall reciprocate within this sleeve. The piston rod shall be fitted with a shaft seal such that, when urged upward into the floating piston, air is compressed within the chamber formed by the sleeve and the end of the piston rod. An air passage is provided between the end of the sleeve and the top of the floating piston and fitted with a one-way valve. At the beginning of the compression stroke, air is compressed in the sleeve until the air pressure in the sleeve chamber exceeds the air pressure in the precharge chamber. At this point, compressed air exits into the precharge chamber.

An air passage is provided which begins with a one-way valve installed at the upper end of the piston rod and extends to where the passage exits the piston rod. The passage provides a fresh air intake to the compressed air chamber formed by the sleeve in the floating piston and the end of the piston rod. Urging the piston rod downward creates a vacuum in this chamber, allowing fresh air to be drawn into the chamber. The distance of travel of the piston rod within the sleeve is set by a plate installed within the lower face of the floating piston which engages a step in the diameter of the piston rod. When the piston rod contacts this plate, it is in its fully retracted location and the air chamber formed by the sleeve and upper end of the piston rod is at its maximum volume.

A stiff compression spring is installed over the piston rod and against the outer face of the plate. The spring is held in place by a pressure adjusting disc which is threaded onto the piston rod. When the piston rod is urged upward, or the floating piston is urged downward, the spring is compressed and the entrapped air in the chamber is compressed. The force exerted by the spring will be at its maximum when the piston rod seats against the restraining plate installed on the floating piston. This maximum spring force is adjustable with the use of the threaded disc. The spring is selected such that it exhibits this upward force on the piston rod when the pressure within the precharge chamber is at its manufacturer's design point. During a compression cycle, the piston rod shall urge the floating piston upward into the precharge chamber, compressing the air charge in the precharge chamber. As the floating piston and piston rod assembly begins the downward stroke, the air pressure from the precharge chamber decreases. The manufacturer's design pressure for the precharge chamber is taken with the floating piston in the fully retracted location. If at any time during the retraction of the floating piston the compressed air pressure in the precharge chamber falls below design, the stiff compression spring will begin to expand and the small air chamber in the floating piston will begin to open. As this happens, fresh air will be drawn into this chamber. This air will be compressed as the compression stroke begins and the stiff spring under the floating piston is compressed until the pressure in the small chamber exceeds the pressure in the precharge chamber. At this point, air will be added into the air charge volume in the precharge chamber. Further cycling of the compression stroke will continue to add air to the precharge chamber until the design pressure for the chamber is achieved.

With these fairly minor changes, a typical air spring assembly can be altered and become capable of automatically maintaining the optimum pressure in the pre-chamber without adversely affecting the performance of the equipment incorporating the air spring assembly.

BRIEF DESCRIPTION OF THE SEVERAL VIEWS OF THE DRAWINGS

These and other features and advantages of the embodiments of the present disclosure will become more apparent by reference to the following detailed narrative when considered in conjunction with the following drawings. In the drawings, like reference numerals are used throughout the Figures to reference like features and components. The Figures are not necessarily drawn to scale.

FIG. 1 is a cross-section view of the basic portions of one example of the Present Art comprising an air shock absorber.

FIG. 2 is a cross-section view of the basic portions of another example of the Present Art comprising pneumatic fastener driver.

FIG. 3 is a cross-section view of one embodiment of the Floating Piston assembly shown with the make-up air volume fully open.

FIG. 4 is a cross section view of one embodiment of the Floating Piston assembly shown with the make-up air volume fully evacuated.

FIG. 5 is an isometric view of the primary parts incorporated in one embodiment of the Floating Piston Assembly FIG. 6 is a cross section view of on embodiment of the Floating Piston assembly shown with a retaining ring at the high point of the compression stroke.

No attempt is made to show all the parts or portions of the mechanical equipment which may utilize the improved air spring embodiments detailed in this narrative. The intent of the drawings is to indicate only those mechanical parts which shall be directly altered or replaced with the present disclosure. Accordingly, the drawings and descriptions will be regarded as illustrative in nature and not as restrictive.

DRAWINGS-REFERENCE NUMERALS

10 Floating Piston Shaft Seal
12 Precharge Chamber
14 Standard Air Spring Piston
16 Standard Piston Rod
18 Air Charging Valve
20 Piston Stroke
22 Rotary-to-Linear Driver
24 Compression Spring Stack
26 Fastener
28 Discharge One-Way Valve
30 Make-up Air Chamber
32 Intake One-Way Valve
34 Reciprocating Shaft Seal
36 Restraining Plate
38 Adjustment Disc
40 Air Intake Passages
42 Piston Drive Rod
44 Discharge Air Passage
46 Floating Piston
48 Threaded Fastener
50 Sleeve
52 Step
54 Floating Piston Face
56 Electric Motor
58 Retainer

DETAILED DESCRIPTION

The present disclosure is directed to various embodiments to improve the overall operating performance of a typical air spring assembly. Specifically, the embodiments presented are directed toward enabling the floating piston employed in a typical air spring assembly to additionally operate as a generator of make-up air for precharge chamber 12. As such the operation of the floating piston will provide the air spring assembly with a means of maintaining the required precharge air pressure to closely match the manufacturer's requirements. The narrative will begin with FIG. 1 and FIG. 2 as a basic discussion of the operation of that portion of a typical air spring assembly which shall be altered to meet the design requirements of the improvements presented herein. The primary operation of a typical air spring assembly is presented as follows:

a—Prior to initial operation, compressed air is pumped into precharged chamber 12 through one-way valve 18.

b—A force is directed through piston drive shaft 44 urging standard air spring piston 14 against the air pressure in precharge chamber 12, increasing the pressure in precharge chamber 12 while creating a store of energy in chamber 12.

c—FIG. 1 indicates the air spring's use as an energy dampener similar to that used in a vehicle suspension system. The air spring assembly absorbs most of the force transmitted through standard piston drive shaft 16 while greatly reducing the force transmitted through precharge chamber 12 and into the vehicle body.

d—FIG. 2 indicates the air spring's use as a controlled energy storage assembly similar to a precharged fastener driver. An electric motor 56 coupled to a rotary linear driver 22 urges standard air spring piston 42 against the compressed air in precharged chamber 12 the design distance of compression stroke 20, When rotary linear driver 22 is decoupled from standard piston drive shaft 16, the energy stored in the compressed air charge in precharge chamber 12 by compression stroke 20 is released to drive air spring piston 14 and piston drive shaft 16 assembly downward against fastener 26

The above basic description of the operation of a portion of the prior art summarizes a more detailed explanation of the functions and operation of a typical precharged pneumatic air spring found in the above referenced patents. The typical air spring assembly requires the services of an air compressor to charge and maintain the pressure in precharged chamber 12. This is normally done by the manufacturer prior to the sale of the device utilizing the air spring assembly. Through continual use or just over time, the slow leakage of air from precharged chamber 12, primarily past air spring piston 10 seal(s), drops the pressure of air within precharged chamber 12 below the design operating point. Now, the air spring assembly must be re-charged by the owner or returned to a service center to have air (or nitrogen) pumped into the chamber until the design operating pressure is restored.

This narrative will present a method whereby an existing air spring assembly may, with relatively few and simple modifications, be modified to additionally perform as an internal air compressor to automatically maintain the required precharge without affecting the air spring's primary design objective. FIG. 3 indicates a floating piston assembly whereby floating piston body 12 is similar to typical air spring piston 14, However, a sleeve 50 has been installed down the centerline axis of piston 14. Additionally, air relief passage 44 is fitted with a one-way valve 28 providing a path for air to travel into precharge chamber 12 from the top of sleeve 50. The standard piston drive shaft 16 has been altered to become piston drive shaft 42. The forward end of drive shaft 42 is fitted with shaft seal 34 and reciprocates within sleeve 50. The forward end of drive shaft 42 is then stepped down in diameter. This step forms a basis for retaining the forward portion of drive shaft 42 within sleeve 50. A retaining plate 36 is installed over piston drive shaft 42 and secured to piston 14 with threaded fasteners 48. A relatively stiff compression spring assembly 24 is then fitted over piston drive shaft 42 and placed against retaining plate 36 by pressure adjusting disc 38.

Assembly of the invention's present embodiment is indicated with FIG. 3 and FIG. 4 with FIG. 5 included as an assembly view. Piston rod 42 reciprocates within floating piston sleeve 50. The maximum downward travel of piston rod 42 within sleeve 50 is set by the step in diameter of rod 42 contacting retaining plate 36. The maximum upward travel of piston rod 42 is attained when the top of rod 42 contacts the closed end of sleeve 50. When the piston rod 42 is urged downward, make-up air chamber 30 is created between the top of piston rod 42 and the closed end of sleeve 50. Urging piston rod 42 downward within sleeve 50 will create an air vacuum in make-up air chamber 30. An ambient air passage 40 is provided in piston rod 42 and fitted with a one-way valve 32 such that, with the creation of a vacuum in chamber 30, ambient air will be drawn into chamber 30 through air passage 40. When piston rod 42 is urged upward in sleeve 50, the pressure in make-up air chamber 30 will increase. When the air pressure in chamber 30 exceeds the air pressure in precharge chamber 12, compressed air will flow through discharge one-way valve 28 and out into precharge chamber 12 through discharge air passage 44.

Make-up air chamber 30 is held at its maximum air volume by the stiff compression spring stack 24. When a sufficient force is applied to face 54 of floating piston 46 by the air pressure in precharge chamber 12, spring 24 is compressed and the enclosed air volume in chamber 30 is reduced, sending compressed air into precharge chamber 12. The amount of force exerted by spring 24 against floating piston 46 and creating chamber 30 may be adjusted moving threaded disc 38 further upward against spring 24. The required compression spring may take many configurations. A standard helical compression spring may be employed but any elastic material similar to rubber may also be used. FIG. 5 indicates the required spring to be configured from a stack of wave springs. Wave springs offer the advantages of high compression forces resulting from a relatively small amount of spring travel.

The optimum design pressure within precharge chamber 12 is selected by the manufacturer of the air spring assembly and is normally the design compressed air pressure in precharge chamber 12 before the beginning of compression stroke 20. Should the air pressure in precharge chamber 12 falls below this design point, compressed air must be added to the precharge air volume until the design pressure in the chamber is achieved. To accomplish this goal with the embodiments presented, first select the compression spring stack 24. When using wave springs, the stack will be comprised of a number of individual wave springs, installed as a stack whereby the final assembled stack exhibits both the desired height when unloaded and maximum compressive force when fully compressed. When charged to design pressure, the force exerted by this pressure against face 54 of floating piston 46 will be at a minimum when floating piston 46 is at its fully retracted position (Piston stroke 20 @ zero). Select compression spring 24 such that the resisting spring force with the floating piston 46 fully retracted is just sufficient to place make-up air chamber 30 in the fully closed position. Should the air pressure in precharge chamber 12 falls below design at this point, compression spring 24 will expand against the floating piston, drawing ambient air into chamber 30 (FIG. 3). Air will continue to flow into chamber 30 until the force created by the air pressure in precharge chamber 12 is equal or greater than the force created by compression spring 24. However, when the precharge chamber 12 is at design pressure when the floating piston is fully retracted (FIG. 4), make-up air chamber 30 will remain closed and the subsequent compression stroke will be accomplished without fresh air being pumped into precharge chamber 12.

It should be noted that make-up air from chamber 30 will only be discharged into the precharge chamber 12 when the downward force exerted on face 54 of the floating piston assembly is greater than the upward force exerted by the spring 24. This downward force is generated by the compressed air pressure present in precharge chamber 12. This force is at its low point with the floating piston assembly at the point of full retraction and increases as the compression stroke urges the assembly upward into precharge chamber 12. When the precharge chamber is close to or is fully evacuated (chamber at atmospheric pressure), there may not be sufficient pressure increase in the chamber during the compression stroke to overcome both the friction imposed by shaft seal 34 and the compression force exerted by spring 24. FIG. 6 indicates the addition of a retaining ring 58 attached to the inside diameter of precharge chamber 12. The retaining ring 58 functions to contact floating piston 46 near the end of compression stroke 20 whenever air remains in chamber 30 and holds piston 46 in this position while piston drive rod 42 completes compression stroke 20. If the precharge chamber pressure is fully charged up to its design, or during the compression stroke the compressed air in chamber 30 is completely discharged into the precharge chamber, piston rod 42 will be at its high point in regard to piston body 46 (FIG. 4). At this point, piston 46 will contact the retaining ring 58 at the end of the compression stroke. The addition of the retaining ring 58 helps to assure that compressed air will still be delivered into precharge chamber 12 during a compression stroke 20 even if chamber 12 is fully evacuated (at atmospheric pressure) at the beginning of stroke 20. Furnished and installed as noted herein, charging valve 18 is redundant when it comes to providing a compressed air charge in the precharge chamber 12. However, its inclusion provides a method whereby the pressure in the precharge chamber 12 may be determined with a pressure gauge as well as a method by which the manufacturer may quickly bring the precharge chamber up to design pressure prior to sale.

Should the optimum design pressure for precharge chamber 12 be changed. Increasing the compressive force exerted from compression spring 24 by rotating adjustment disc 38 upward against the spring will reset the minimum pressure available in precharge chamber 12 to a higher value. Conversely, decreasing the compression spring 24 force by rotating disc 38 downward will reset the minimum pressure available in precharge chamber 12 to a lower value.

OPERATION

Upon assembly as indicated on FIG. 3 and FIG. 4, the floating piston and drive shaft assembly is inserted into precharge chamber 12. With the floating piston and drive shaft assembly in the fully retracted position, precharge chamber 12 is then charged through charging valve 18 to the manufacturer's design pressure. As an alternative to using charging valve 18, the assembly may be operated through a series of compression cycles until the design pressure is achieved. If the pressure in precharge chamber 12 returns to the manufacturer's design pressure at the end of each compression cycle (floating piston 46 fully retracted), the air spring assembly will operate normally as an air spring. The piston rod 42 will extend into floating piston body 46 until there is no air volume in make-up air chamber 30. At this point, the wave spring stack 24 is fully compressed. However, a loss in air pressure to below design in precharge chamber 12 will result in the force from wave spring stack 24 exceeding the opposing force from precharge chamber 12 against face 54 of floating piston 46. This will result in floating piston 46 moving upward in relation to piston rod 42, creating a vacuum in make-up air chamber 30. Fresh air will fill this vacuum through air passage 40. The volume of stored air at atmospheric pressure drawn into make-up air chamber 30 at the end of each compression cycle will increase as the pressure in precharge chamber 12 drops further below the manufacturer's design pressure. This volume will be the greatest with the floating piston assembly fully retracted. As the floating piston assembly begins a compression stroke, the floating piston will be urged downward in relation to piston drive rod 42. With a reduction in volume within make-up air chamber 30, the pressure will increase with the compression stroke to the point to where the pressure in make-up air chamber 30 will exceed the pressure in precharge chamber 12. At this point, compressed air will begin to flow through one-way valve 28 and through air passage 44 into precharge chamber 12. During the compression stroke, wave spring stack 24 will continue to compress. Subsequent cycling of compression stroke 20 will continue to add compressed air to precharge chamber 12 until the design pressure in precharge chamber 12 is reached.

It is noted that, in addition to make-up air chamber 30, there will exist other spaces in which compressed air may be stored. One is the space between sleeve 50 and piston rod 12 which will vary by the tolerances set during manufacture. Additionally, there will be space in the groove provided for shaft seal 34 on piston rod 42 which will be larger than the seal which occupies the space. Lastly, there will be a small space between one-way valves 32 and 28 the make-up air chamber 30. Attempting to accurately determine the exact volume added by such areas will be difficult at best. To function as designed, the total air storage volume presented by these spaces must be as small as practical when compared to the volume of air which fills make-up air chamber 30.

CONCLUSION

With these rather simple modifications and additions, the design purpose of creating a method for maintaining the design compressed air pressure in precharge chamber 12 will be achieved while retaining the primary use of the assembly to act as an air spring. A means has been presented which indicates an arrangement by which the assembly may be utilized to both achieve and maintain the optimum compressed air charge in precharge chamber 12 (FIGS. 3 and 4). Each compression stroke cycle will initiate a test of the storage pressure in precharge chamber 12 and add compressed air if required with each subsequent cycle until chamber 12 is brought up close to design pressure. Additionally, the chamber's storage pressure may be set for optimum performance and not be required to be pressurized past this point to account for future leakage.

I claim:

1. An apparatus comprising:
   a. a floating piston assembly configured to reciprocate in a precharge chamber of a cylinder, the floating piston assembly comprising a cylindrical cavity having an open side and a closed side opposite to the open side;
   b. a piston drive rod comprising an end extending into the open side of the cylindrical cavity of the floating piston assembly and a shaft seal on the end, wherein the floating piston assembly is configured to reciprocate over the end of the piston rod, wherein air stored in the cylindrical cavity is compressed in response to the the piston rod being urged further into the cylindrical cavity, and wherein air pressure in the cylindrical cavity is decreased in response to the piston drive rod being retracted from the cylindrical cavity such that a volume of the air in the cylindrical cavity increases;
   c. a first air passage and a first one-way valve in the first air passage that are configured to allow ambient air to be drawn into the cylindrical cavity;
   d. a compression spring on the piston drive rod, the compression spring having one end against the floating piston assembly and an opposing end against a step protruding outward from the piston drive rod; and
   e. a second air passage in the floating piston assembly and a second one-way valve in the second air passage that are configured to allow the air to flow from the cylindrical cavity to the precharge chamber in response to the air pressure in the cylindrical cavity being greater than air pressure in the precharge chamber,
   f. wherein the floating piston assembly, in response to being urged along the piston drive rod by the air pressure in the precharge chamber, compresses the compression spring and the volume of the air contained in the cylindrical cavity,
   g. wherein the floating piston assembly is configured to create a vacuum in the cylindrical cavity in response to the floating piston assembly being urged along the piston drive rod by the compression spring, and
   h. wherein the piston drive rod's location and travel within the floating piston assembly are controlled.

2. The apparatus of claim 1, wherein the step protruding outward from the piston drive rod comprises a disc over a portion of the piston drive rod, wherein movement of the disc toward the floating piston assembly increases a force applied from the compression spring on the floating piston assembly and wherein movement of the disc away from the floating piston assembly decreases the force applied from the compression spring on the floating piston assembly to adjust a maximum pressure setting for the precharge chamber.

3. The apparatus of claim 1, further comprising a retainer configured to hold the floating piston assembly in place while the piston drive rod completes a compression stroke in which substantially all the air enclosed in the cylindrical cavity is discharged into the precharge chamber.

* * * * *